United States Patent [19]

Barbeau

[11] 4,314,443

[45] Feb. 9, 1982

[54] TURBINE ENGINE CONSTRUCTION

[75] Inventor: Dennis E. Barbeau, Liberty Center, Ohio

[73] Assignee: Teledyne Industries, Inc., Los Angeles, Calif.

[21] Appl. No.: 958,544

[22] Filed: Nov. 8, 1978

[51] Int. Cl.³ .............................................. F02C 3/14
[52] U.S. Cl. .................................. 60/39.36; 60/751; 60/752
[58] Field of Search ................. 60/39.36, 39.65, 751; 415/207, 211

[56] References Cited

U.S. PATENT DOCUMENTS

| | | | |
|---|---|---|---|
| 2,556,161 | 6/1951 | Bailey et al. | 60/39.65 |
| 3,019,606 | 2/1962 | Franz | 60/39.65 |
| 4,098,074 | 7/1978 | Greenberg et al. | 60/39.36 |
| 4,168,609 | 9/1979 | Greenberg et al. | 60/39.36 |

FOREIGN PATENT DOCUMENTS 627644  8/1949  United Kingdom ............... 60/39.65

Primary Examiner—Louis J. Casaregola
Attorney, Agent, or Firm—Gifford, Van Ophem, Sheridan & Sprinkle

[57] ABSTRACT

A turbine engine construction comprising a support housing, a compressor, combustor and turbine expander contained within the support housing. The combustor includes a combustor housing defining an inner combustion chamber and an outer chamber between the combustor housing and the support housing. Compressed air from the compressor outlet is communicated to the combustion chamber into which fuel is injected and ignited so that the resulting combustion products expand through a turbine nozzle and into the turbine expander. The novelty of the present invention resides in the construction of a diffuser assembly integrated with both the turbine nozzle and combustor. The diffuser assembly comprises a plurality of diffuser tubes, each tube having one end open to and in registration with the compressed air outlet of the compressor. The other ends of the tubes are arranged in at least two discharge planes for the combustor to improve and increase induced mixing and swirl in the combustion chamber. Preferably, at least one set of diffuser tubes discharges compressed air within the mixing zone of the combustion chamber and at a predetermined axial angle with respect to the turbine engine axis to provide a more uniform temperature into and through the turbine nozzle. The angular discharge from this set of diffuser tubes enables the turbine nozzle to be unwrapped from the conventional axial direction thus reducing both the axial length of the combustor and also the aerodynamic loading on the turbine nozzle.

5 Claims, 3 Drawing Figures

4,314,443

TURBINE ENGINE CONSTRUCTION

BACKGROUND OF THE INVENTION

I. Field of the Invention

The present invention relates generally to turbine engine constructions and, more particularly, to a diffuser assembly for a turbine engine for an integrated combustor and turbine nozzle system.

II. Description of the Prior Art

Turbine engines conventionally include a support housing in which a turbine shaft is rotatably journalled. A compressor is connected to the turbine shaft and provides compressed air into a combustor means having a combustion chamber. Fuel is introduced into the combustion chamber and, upon combustion, the resulting hot and expanding combustion products expand through a relatively stationary turbine nozzle and into a turbine expander which rotatably drives the turbine shaft.

Typically, the combustor means includes a combustor housing which is annular in shape and defines the interior combustion chamber and a further chamber between the outer periphery of the combustor housing and the turbine support housing. The compressed air from the turbine engine compressor is exhausted into this outer annular chamber and thereafter enters the combustion chamber through a swirl plate in the combustor housing and other openings between the outer annular chamber and the combustion chamber.

In these previously known turbine engine constructions, however, the diffuser assembly has not been well integrated with either the combustor or the turbine nozzle. This lack of integration in turn results in more adverse temperature profiles, and/or larger volume turbine engines and/or less efficient turbine engines than can be otherwise accomplished. The turbine nozzle and rotor must be designed to accommodate the maximum local expected temperature of the combustor exhaust gases even though the average or mean temperature of the combustor exhaust gases is substantially less. The maximum survival temperature of the turbine nozzle is, as a practical matter, limited so that the lack of uniformity of the combustor exhaust gas temperature unnecessarily limits the overall efficiency for the turbine engine.

In these previously known turbine engine constructions, the combustion products exhausting from the combustion chamber and through the turbine nozzle enter the turbine nozzle with substantially an axial velocity direction component. The turbine nozzle, typically comprising a plurality of radially extending and circumferentially spaced vanes between the support housing and the combustor housing, diverts or shapes this gas circumferentially so that the gas flow exiting from the turbine nozzle impinges upon the first turbine wheel of the expander at an angle designed for maximum turbine efficiency. the turbine nozzle thus undergoes a great deal of aerodynamic loading which, again, creates an operating limitation for the overall turbine engine. Moreover, the nozzle must be of an axial length sufficient to shape the fluid flow without excessive aerodynamic loading on the vanes which significantly increases the overall length of the turbine engine.

SUMMARY OF THE PRESENT INVENTION

The present invention overcomes the above mentioned disadvantages of the previously known turbine engine constructions by providing a turbine engine in which the diffuser assembly is integrated with both the combustor and turbine nozzle components for maximum turbine engine efficiency.

In brief, the turbine engine according to the present invention achieves these goals by a unique diffuser assembly comprising a plurality of tubes circumferentially positioned about the combustor housing and wherein one end of each tube is open to and in registry with the compressed air outlet from the compressor. Unlike the previously known turbine engine constructions, however, the other ends of the diffuser tubes are arranged in at least two discharge planes in the combustor integrated with the combustor to improve mixing and swirl and overall system performance.

In the preferred form of the invention, one set of diffuser tubes are open at their second end to the outer annular chamber between the combustor housing and the support housing and discharges sufficient compressed air to meet the cooling requirements for the combustor housing and also the compressed air requirements for the primary zone of the combustion chamber, i.e. the combustion chamber zone in which the fuel is introduced and ignited. Conversely, the second end of a second set of diffuser tubes is open to the mixing zone of the combustion chamber, i.e. immediately upstream of the turbine nozzle, to provide a more uniform gas temperature into the nozzle. In addition, the second set of diffuser tubes exhaust the compressor outlet at a predetermined axial angle toward the nozzle to permit a less cambered turbine nozzle to be employed which in turn results in reduced aerodynamic loading and a reduced axial length of the turbine nozzle.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
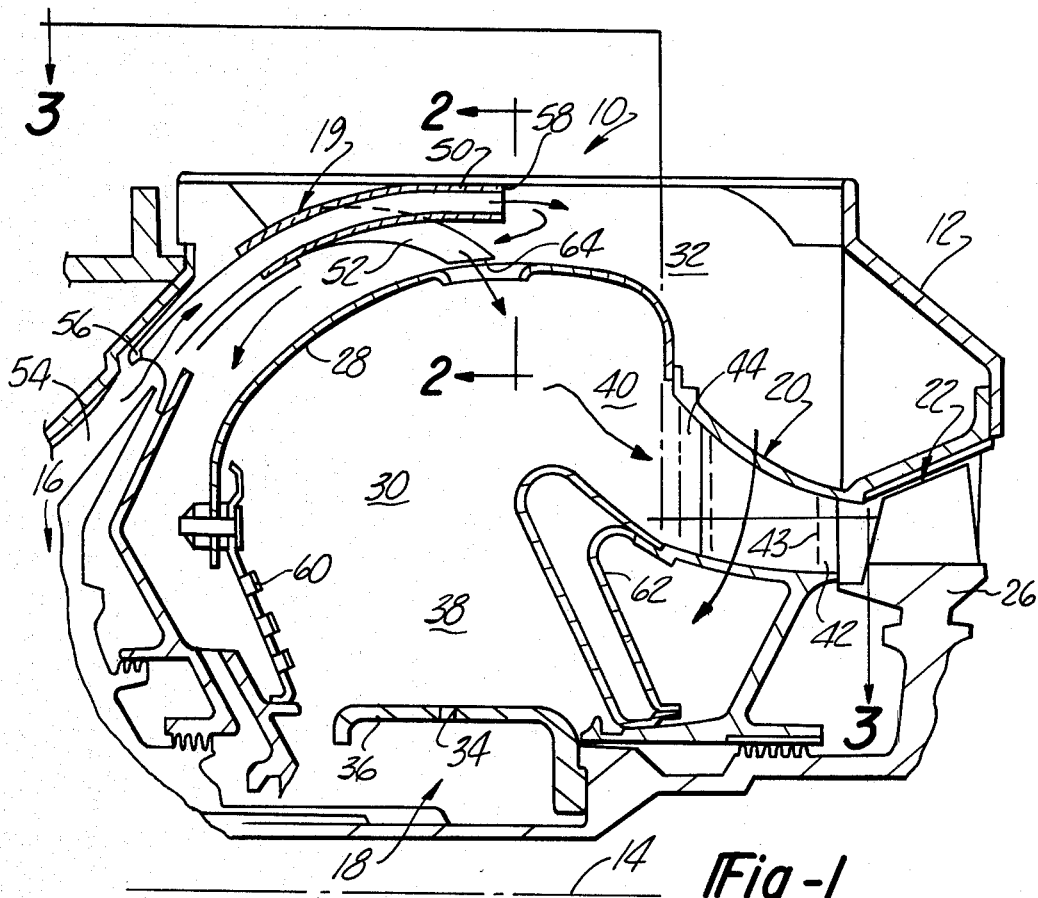
FIG. 1 is a fragmentary sectional view illustrating the integrated turbine engine construction of the present invention.

With reference first to FIG. 1, the integrated turbine engine construction 10 according to the present invention is thereshown and comprises an outer support housing 12 in which a turbine main shaft 14 (illustrated only diagrammatically) is rotatably journalled. In the conventional fashion, the turbine engine 10 includes a compressor section 16 which provides compressed air to a combustor section 18 via a diffuser means 19 which will be subsequently described in greater detail. Fuel is mixed in the combustor section 18 with the compressed air and ignited whereupon the resulting hot and expanding combustion products exhaust past a relatively stationary nozzle 20 and through a turbine expander 22 comprising one or more turbine stages 26.

The combustor section 18 of the engine 10 is of more or less conventional construction and includes an annular combustor housing 28 which defines an annular combustion chamber 30 within its interior and a further annular chamber 32 between the support housing 12 and the outer periphery of the combustor housing 28. Fuel is introduced through an orifice 34 in a fuel plate 36 into a primary zone 38 of the combustion chamber 30 and ignited. The resulting combustion products exhaust through the nozzle 20 via a mixing zone 40 in the combustion chamber 30 immediately upstream of the nozzle 20.

Figure 3:
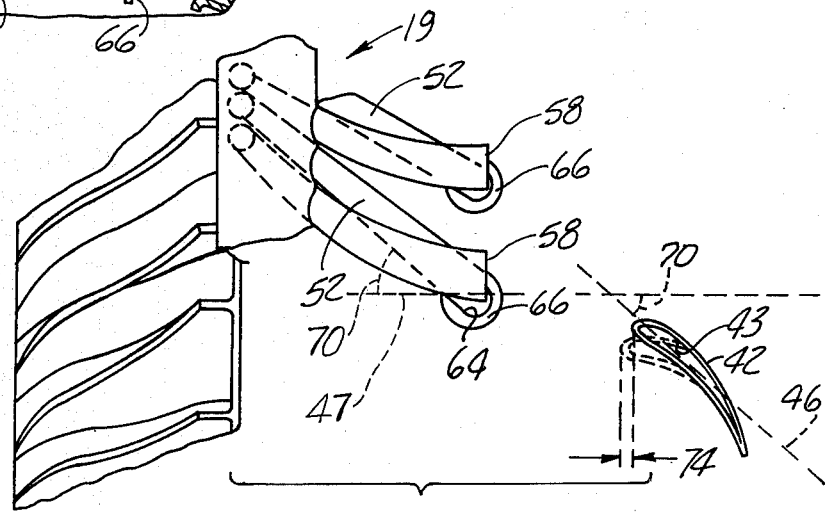
FIG. 3 is a fragmentary sectional view taken substantially along line 3—3 in FIG. 1.

The nozzle 20 comprises a plurality of radially extending and circumferentially spaced vanes 42 which extend across the exhaust stream passageway 44 between the combustion chamber 30 and the turbine expander means 22. As is best shown in FIG. 3, each turbine vane 42 is disposed on a plane 46 oblique with respect to the axis 47 of the turbine engine and is designed to shape the flow through the nozzle and into the first turbine stage 26 for maximum turbine efficiency.

Figure 2:
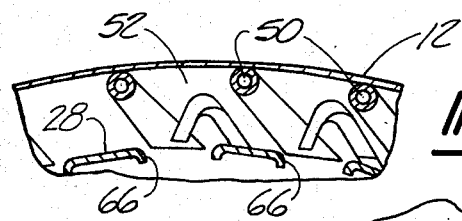
FIG. 2 is a fragmentary sectional view taken substantially along line 2—2 in FIG. 1.

With reference to FIGS. 1 and 2, the novelty of the present invention, however, resides in the diffuser assembly 19 which is integrated in design with both the combustion chamber 30 and the nozzle 20 for maximum efficiency. The diffuser assembly 19 comprises a plurality of tubular diffuser tubes 50 and 52 which are circumferentially spaced and annularly wrapped about the combustor housing 28. One end 56 of each tube is open to and in registration with the outlet 54 from the turbine compressor means 16 so that the entire compressed air outlet from the compressor means 16 flows through the tubes 50 and 52.

The tubes 50, which can comprise, for example, every other tube in the diffuser assembly 19 extends substantially axially through the combustor means and along the chamber 32 for substantially the entire length of the combustor housing 28. The other end 58 of each tube 50 is open to the chamber 32 and supplies a relatively low velocity compressed air flow around the outer periphery of the combustor housing 28 and to the primary zone 38 of the combustion chamber 30 via a swirl plate 60. A portion of the air flow from the tubes 50 passes through a hollow passageway 43 in the turbine vanes 42 and likewise supplies compressed air to the primary zone 38 of the combustion chamber 30 via a slinger 62. The first set of tubes 50, thus provides the necessary cooling for both the turbine nozzle 20 and combustor housing 28 and also provides the compressed air requirements for the primary zone 38 of the combustion chamber 30.

Conversely, the second set of diffuser tubes 52 taper radially inwardly so that the other end 64 of each conduit 52 is open through an opening 66 in the combustor housing 28 to the mixing zone 40 of the combustion chamber 30. The discharge velocity from the diffuser tubes 52 is substantially greater than the discharge velocity from the first diffuser tubes 50 and thus achieves virtually complete mixing of the combustion products prior to their entry into the turbine engine nozzle 20. Moreover, due to the complete mixing of the combustion products from the second tubes 52 in the combustion chamber mixing zone 40, the previously known wide temperature variations of the combustion products entering the turbine nozzle 20 are avoided.

With particular reference now to FIG. 3, the open ends 64 of the second diffuser tubes 52 are angled with respect to the axis 47 of the turbine engine as shown by angle 70 so that the compressed air discharge from the diffuser tubes 52 is similarly axially angled. This in turn permits the vanes 42 of the turbine nozzle 20 to be unwrapped from the conventional axial direction, illustrated in phantom line, to the position shown in solid line wherein the plane 46 of each vane 42 is substantially parallel with the discharge angle 70 from the diffuser tubes 52. By integrating the diffuser assembly 19 with the turbine nozzle 20 in this fashion, the unwrapped turbine nozzle 20 is subjected to a lower aerodynamic loading than with the previously known turbine engines. In addition the axial length of the turbine nozzle, and thus of the turbine engine, is reduced by a distance 74, i.e. the difference in nozzle length between the previously known axial vanes and the unwrapped nozzle 20 of the present invention achieved by integrating the diffuser assembly 19 with the nozzle 20.

From the foregoing, it can be seen that the present invention provides an integrated turbine engine construction for increased turbine efficiency and operation. In particular, by directing the compressor compressed air output into at least two discharge planes via the diffuser assembly and by matching the compressed air output into each of these planes in accordance with the requirements of the overall combustor assembly and turbine nozzle, an increased turbine engine efficiency is achieved. In addition, this integration simultaneously reduces the overall turbine engine length and minimizes temperature variations into and through the turbine nozzle thus enabling higher mean temperatures in the combustor.

Having described my invention, however, many modifications thereto will become apparent to those skilled in the art to which it pertains without deviation from the spirit of the invention as defined by the scope of the appended claims.

I claim:

1. A turbine engine construction comprising a support housing, a compressor means, combustor means and a turbine expander means within the support housing, said compressor means having a compressed air outlet open to the combustor means and said combustor means having an outlet open to the turbine expander means, a diffuser means for fluidly connecting said compressor means outlet to said combustor means, said diffuser means including ducting means for discharging compressed air from the compressor outlet into the combustor means at at least two discharge planes;

wherein said diffuser means further comprises at least two diffuser tubes, each tube having a first end open to and in registration with the compressor outlet, and each tube having a second end open to the combustor means, said second ends of the tubes being open to the combustor means at different discharge planes in the combustor means;

wherein the discharge plane of at least one tube is angled with respect to the discharge plane of the other tube;

wherein said combustor means further comprises a housing defining a combustion chamber within said combustor housing and a further chamber between said support housing and said combustor housing, at least one of said diffuser tubes exhausting the compressor output into said further chamber and at least one of said diffuser tubes exhausting its compressed air output through an opening in said combustion housing and into the combustion chamber;

said turbine engine including a nozzle between said combustor means and said expander means, wherein said combustor housing is annular in shape and wherein said last mentioned diffuser tube discharges compressed air radially inwardly into said combustion chamber and at a predetermined axial angle with respect to the axis of said combustor housing, the discharge from said last mentioned diffuser tube being directed generally toward the turbine nozzle; and wherein the discharge angle of said last mentioned diffuser tube is substantially aligned in the direction of the discharge angle of the turbine nozzle.

2. The invention as defined in claim 1 wherein said diffuser means further comprises a plurality of diffuser tubes positioned annularly around the combustor housing, said tubes being circumferentially adjacent each other, a first set comprising a plurality of said tubes having their second ends open to the further chamber and a second set comprising a plurality of said tubes having their second ends open to the combustion chamber through a like number of openings in the combustor housing.

3. The invention as defined in claim 2 wherein said combustion chamber comprises a primary zone into which fuel is introduced and ignited, and a mixing zone immediately upstream from the turbine nozzle, said first set of diffuser tubes providing the compressed air requirements of the combustion chamber primary zone via said further chamber, and said second set of diffuser tubes having their second ends open to the combustion chamber mixing zone.

4. The invention as defined in claim 3 and further comprising means for discharging compressed air from the second set of diffuser tubes at a velocity greater than the compressed air discharge velocity from the first set of diffuser tubes.

5. The invention as defined in claim 3 wherein the compressed air discharge from the first set of diffuser tubes provides the cooling air requirements for both the turbine nozzle and the combustor housing.

* * * * *